United States Patent [19]
Dan et al.

[11] Patent Number: 6,148,290
[45] Date of Patent: Nov. 14, 2000

[54] SERVICE CONTRACT FOR MANAGING SERVICE SYSTEMS

[75] Inventors: Asit Dan, Pleasantville; Francis Nicholas Parr, Croton-on-Hudson, both of N.Y.

[73] Assignee: International Business Machines Corporation, Armonk, N.Y.

[21] Appl. No.: 09/148,618

[22] Filed: Sep. 4, 1998

[51] Int. Cl.[7] .................................................. G06F 17/60
[52] U.S. Cl. .................................................. 705/1; 705/8
[58] Field of Search ............................................. 705/1, 8

[56] References Cited

U.S. PATENT DOCUMENTS

| | | | |
|---|---|---|---|
| 5,216,592 | 6/1993 | Mann et al. | 364/401 |
| 5,440,672 | 8/1995 | Araki | 395/51 |
| 5,535,383 | 7/1996 | Gower | 395/600 |
| 5,630,127 | 5/1997 | Moore et al. | 395/615 |
| 5,638,519 | 6/1997 | Haluska | 395/228 |
| 5,802,509 | 9/1998 | Maeda et al. | 706/59 |

FOREIGN PATENT DOCUMENTS

| | | |
|---|---|---|
| 786 728 | 1/1997 | European Pat. Off. ........ G06F 15/00 |
| WO 97/41688 | 6/1997 | WIPO . |
| WO 99/17515 | 8/1999 | WIPO . |
| WO 99/06933 | 11/1999 | WIPO . |

OTHER PUBLICATIONS

Lorcy, S. et al., "A Framework managing quality of service contracts in distributed applications", Technology of Object-Oriented Languages, Aug. 1998, pp. 125–137.

Xiaolei Qian, "The Deductive Synthesis of Database Transactions", ACM Transactions on Database Systems, Dec. 1993, pp. 626–677.

Kathy Scott, "Package promises improved service contract management", Network World, p. 43, Jul. 1,1996.

"Fast Track Schedule 5.0", MACWORLD, p. 66, Dec. 1, 1997.

George Cigale, "Fast Track Schedule gains useful collaboration feature", Infoworld, p. 125, Apr. 6, 1998.

*Primary Examiner*—Eric W. Stamber
*Assistant Examiner*—Steven F. Vincent
*Attorney, Agent, or Firm*—David M. Shofi

[57] ABSTRACT

A service contract system for providing a service includes a communication network, a plurality of parties coupled to the communication network and a service contract specifying unambiguous rules of interaction for the parties during transactions for the service. A method for managing service transactions between a plurality of parties coupled to a communication network, includes the steps of jointly developing a service contract having unambiguous rules of interaction between the plurality of parties regarding a service, registering the service contract in each of the plurality of parties and generating, from the service contract, enforcer modules consistent with the rules of interaction for managing transactions of the service.

35 Claims, 8 Drawing Sheets

SERVICE CONTRACT FOR MANAGING SERVICE SYSTEMS

FIELD OF THE INVENTION

The present invention relates to service contracts and service systems used in electronic commerce. More particularly, this invention relates to formally specified contracts describing rules for interacting with a service, where the service may be provided either as a computer program or, more generally, as a business process involving human agents.

BACKGROUND OF THE INVENTION

With the substantial increase in use of the Internet and, particularly, the World Wide Web ("Web"), electronic commerce is emerging as an important tool for service providers. Consequently, a need has developed for a system of providing service instructions and rules of interaction between parties to the service.

FIG. 1 describes a conventional system in which informal instructions for correct use of a service are provided by a computer program where another computer program uses and benefits from the service. The illustrated system provides an example of how a computer program which can be executed to provide some useful service might, with techniques well known to those skilled in the art, have its "instructions" for use defined informally as a guide, a manual or some other form of text.

A computer program 100 executes on a computer or processor and provides a service FUNC 102. This program 100 has a number of defined interfaces so that other programs can call it to obtain functions from the service FUNC 102. For example, three call interfaces 104, 106 and 108 (e.g., method calls on the object FUNC 102 in object programming terminology) are provided. Typically, these interfaces will have a name allowing them to be called (e.g., F1, F2 and F3) and will allow parameters (e.g., p, p1 and p2) to be passed on a call. The instructions 110 on correct use of the service FUNC 102 might state, for example, that the service is initialized by making a call to the interface F1 104 and that, after this call is complete, interface F2 106 may be called multiple times. Furthermore, the instructions might state that the output parameter p2 passed back from the initial call on F2 106 should be reused as an input parameter on the subsequent calls to interface F2 106. These instructions 110, in electronic or hard copy format, would typically be provided as text or as a guide or manual describing the correct use of the service 102. Another computer program 112 which uses the service FUNC 102 provided by program 100 is written in a way which follows the instructions 110 for correct use of the service 102 as specified. Specifically, the program 112 makes an initial call 114 on the interface F1 104.

This call 114 returns an output parameter value p2. The program 112 then executes some other actions, and then makes a first call 116 to interface F2 106 passing in the parameter value p2 as specified in the instructions 110. After some further actions, program 112 makes a second call 118 on interface F2 106 of program 100 also passing in the parameter value p2 as input.

The system of FIG. 1 requires a programmer to read the instructions 110 and to write the program 112 with the instructions 110 in mind. There is a need for a system which eliminates the need for such programmer effort. There is also a need for a system which provides unambiguous rules of interaction for both parties to a service transaction beyond that of simple interface instructions.

FIG. 2 provides a conventional example of informal instructions for correct use of a service 200 provided by, in this instance, a human agent and used by humans who mail documents to and make phone calls to a service provider. As in the preceding example, guidance on the correct use of the service 200 is still necessary in most cases. This guidance is typically provided as a guide or manual or other form of text to be understood by human users.

In FIG. 2, the basic service 200 is an insurance claim handling service. In this case, it is assumed that the service 200 is handled by one or more human agents 202 who can interact with the human claimant 204. The interactions 206, 208, 210 and 212 which are needed to proceed through the claim process involve either completing and mailing forms or making a phone call to pass simpler information. Interaction 206 involves reporting an accident report over the telephone. Interaction 208 involves mailing a claim form. Interaction 210 involves providing a police report number over the telephone. Finally, interaction 212 involves receiving a payment check. The informal instructions 214 on using the service 200 include text describing the required sequence of interactions. The arrows 216, 218, 220 and 222 show that the human claimant must execute each of the actions specified in the instructions 214 in the proper order, with the correct initial information for forms, etc. Finally, supporting computer programs 224 or other services may have to be taken advantage of by the claim processing service 200 itself to complete the service requests. Arrows 226 and 228 show interactions between the claim processing agent 202 and the supporting services 224. These interactions are part of the implementation of the business service 200. Hence, they are not discussed in the instructions 214 for use of the service 200.

While this system, like the system of FIG. 1, provides informal instructions for interaction with a service, it fails to provide complete rules for all parties to a transaction which can eliminate the need for human interaction.

A third example of a conventional service system incorporates the object interfaces defined by the Common Object Request Broker Architecture (CORBA) standard illustrated in FIG. 3. This system includes a CORBA interface specification 300 for objects of type X. The interface specification 300 is written in Interface Definition Language (IDL) and includes method interfaces f1 and f2 on objects of this type. The interface specification 300 includes signatures or parameter list specifications for each of these methods and defines attributes such as a1 and a2 specifying their type. The interface specification 300 can be processed by an IDL compiler to produce the client proxy stub 302 for X objects and the Class implementation skeleton 304. A key objective of CORBA is to allow use of different languages. This is illustrated by showing that, in this case, the implementation skeleton 304 is written in C++ but the client proxy stub 302 is for use in C programs. A sample client program 306 which is written in C and includes the X client proxy stub 302 can make calls on X object instances. Program 306 can be compiled (using a C compiler) to produce the executable client program binary 308. Meanwhile, an implementor of class X can add method bodies 310 written in C++ into the X class skeleton 304. Also an implementer can add C++ declarations 312 for each of the attributes. A C++ compile step produces the compiled implementation 314 of class X included in some object server. The client program 308 is able to make calls on all the methods defined for class X over interconnect 316. The CORBA infrastructure will deliver the calls to the correct server and provide local remote transparency, if necessary. Using these calls, separate X instances 318, 320 and 322 can be 20 created and manipulated. Each instance has its own private set of attribute values holding its state.

Thus, CORBA allows for complete specification of the interface for an object type. It also enables automated processing of this interface specification to support clients in one programming language using instances of the object implemented in a different programming language. This automation also covers routing the method calls with local-remote transparency, where necessary. However, this system only deals with interfaces with parameter lists and types. The interface specification does not provide formal rules for interaction between the parties. Furthermore, the interface specification does not provide for multiparty interactions.

The present invention is motivated by a need to be able to provide automated business services, accessible to many clients via widely accessible public or enterprise networks. The service may be implemented by using other business services typically provided on other service processors, belonging to different organizations and also reached via widely accessible public or enterprise networks.

Therefore, there is a need for a service contract which describes the requirements (including the formal rules of interaction) of the provider of the service as well as of the user. There is also a need for a service contract which is formally specified in a language where it can be compiled and used to generate parts of the user and service applications which enforce the interactions. Finally, there is a need for a service contract which supports multiparty interactions.

SUMMARY OF THE INVENTION

The present invention includes a formally specified service contract describing rules for interacting with a service, where the service may be provided either as a computer program or, more generally, as a business process involving human agents. The rules specify both the interaction behavior required for correct use of the service, as well as interaction responsibilities of parties contributing to providing the service. Each party can develop code based on the specification in the service contract to enforce the rules of interactions by all parties.

According to the present invention, the service contract is completely separate from the implementation of the service. Typically the implementation of a service is owned and private to the provider of the service. The service contract formally defines rules for use and requirements of the provider(s) in a form which can be freely shared between users and providers without exposing details of the implementation.

The service contract defines the rules of interaction with the service. This may include allowable sequences of interactions, valid and invalid timings for interactions, state diagrams specifying the interactions, conditions under which the service will be terminated, canceled or compensated, etc.

The service contract may be formally defined, so that automated processing and automated generation of code fragments are included in both the client engine and the provider engine to automate and validate the interactions and processing of service request in both users and providers.

According to the present invention, the development of the service contract and implementation of internal service logic of each party are independent processes. This allows changes in the rules of interaction without always affecting internal service logic. As an example, the identity of the interacting parties may not be known in the service implementation. Similarly, all the available choices in an implementation may be hidden from a service contract and hence, from the interacting parties.

Separation of rules of interaction from implementation of services in each party also allows enforcement of rules of interactions by a third party to the service contract. Finally, each interaction instance may involve multiple exchanges across parties, and the overall duration of an interaction instance as well as the duration of individual operations may be long.

Specifically, the present invention provides a service contract system for providing a service including a communication network, two or more parties coupled to the communication network and a service contract specifying unambiguous rules of interaction for the parties during transactions for the service. The service contract is preferably adapted to facilitate the generation of enforcer code within applications of each of the parties.

It is also preferable that, for any transaction for the service, one of the parties is a N client having a client application and one of the parties is a service provider having a service application and wherein the service contract is adapted to generate a client contract enforcer module to interface with the client application and a server contract enforcer module to interface with the service application. The service application preferably includes service implementation logic wherein the enforcement modules are generated so that the service implementation logic is independent of the rules of interaction for the service.

The present invention also provides a method for managing service transactions between a plurality of parties coupled to a communication network, the method including the steps ofjointly developing a service contract having unambiguous rules of interaction between the parties regarding a service, registering the service contract in each of the parties and generating, from the service contract, enforcer modules consistent with the rules of interaction for managing transactions of the service. The parties preferably include a client and a service provider having a service implementation module. The generating step preferably includes the step of automatically generating, from the service contract, the enforcer modules

BRIEF DESCRIPTION OF THE DRAWING

The present invention will be understood by reference to the drawing, wherein.

DETAILED DESCRIPTION OF THE PREFERRED EMBODIMENT

Figure 1:
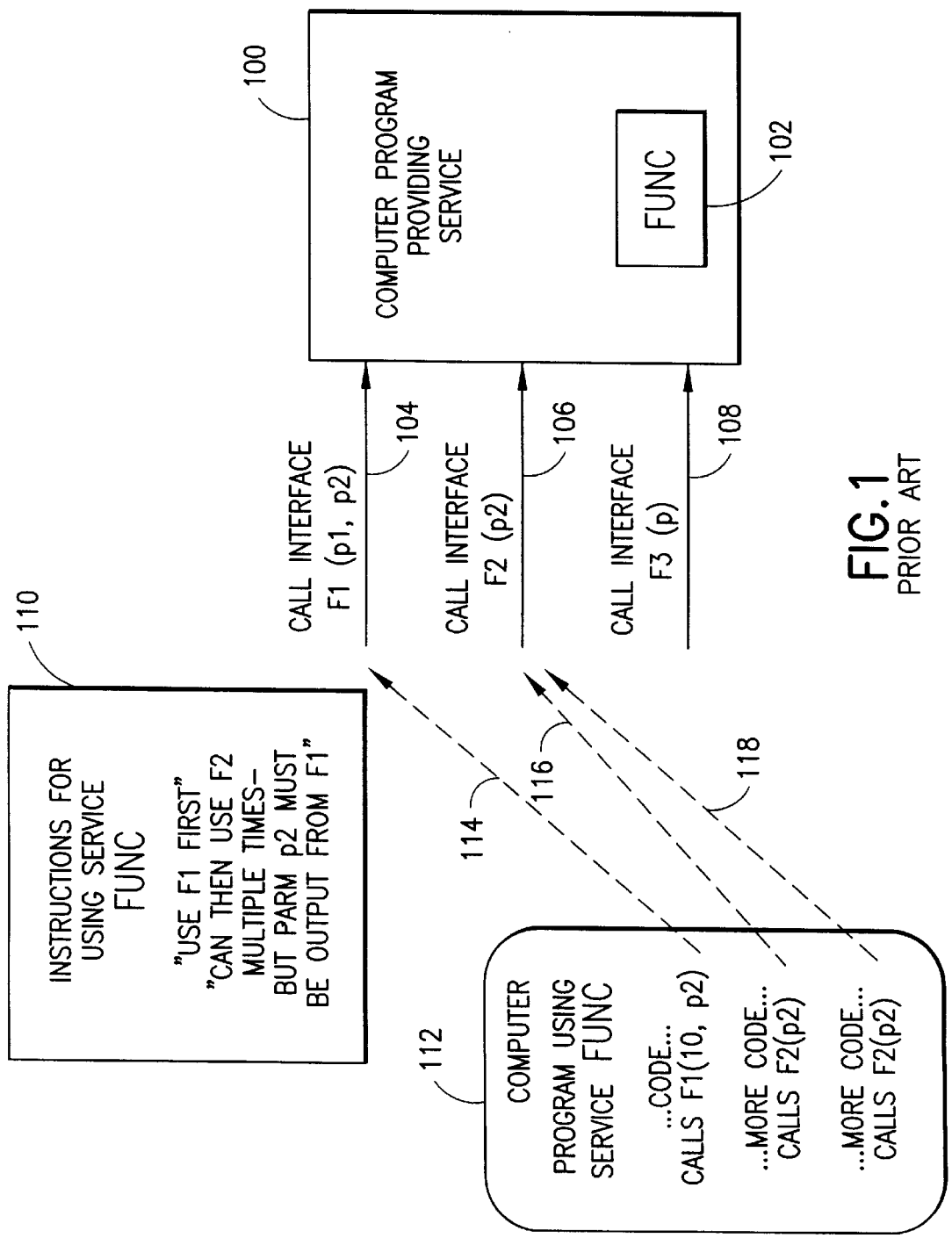
FIG. 1 is a schematic diagram of a conventional service system in which informal instructions describing the use of a service are provided by a computer program.
Figure 2:
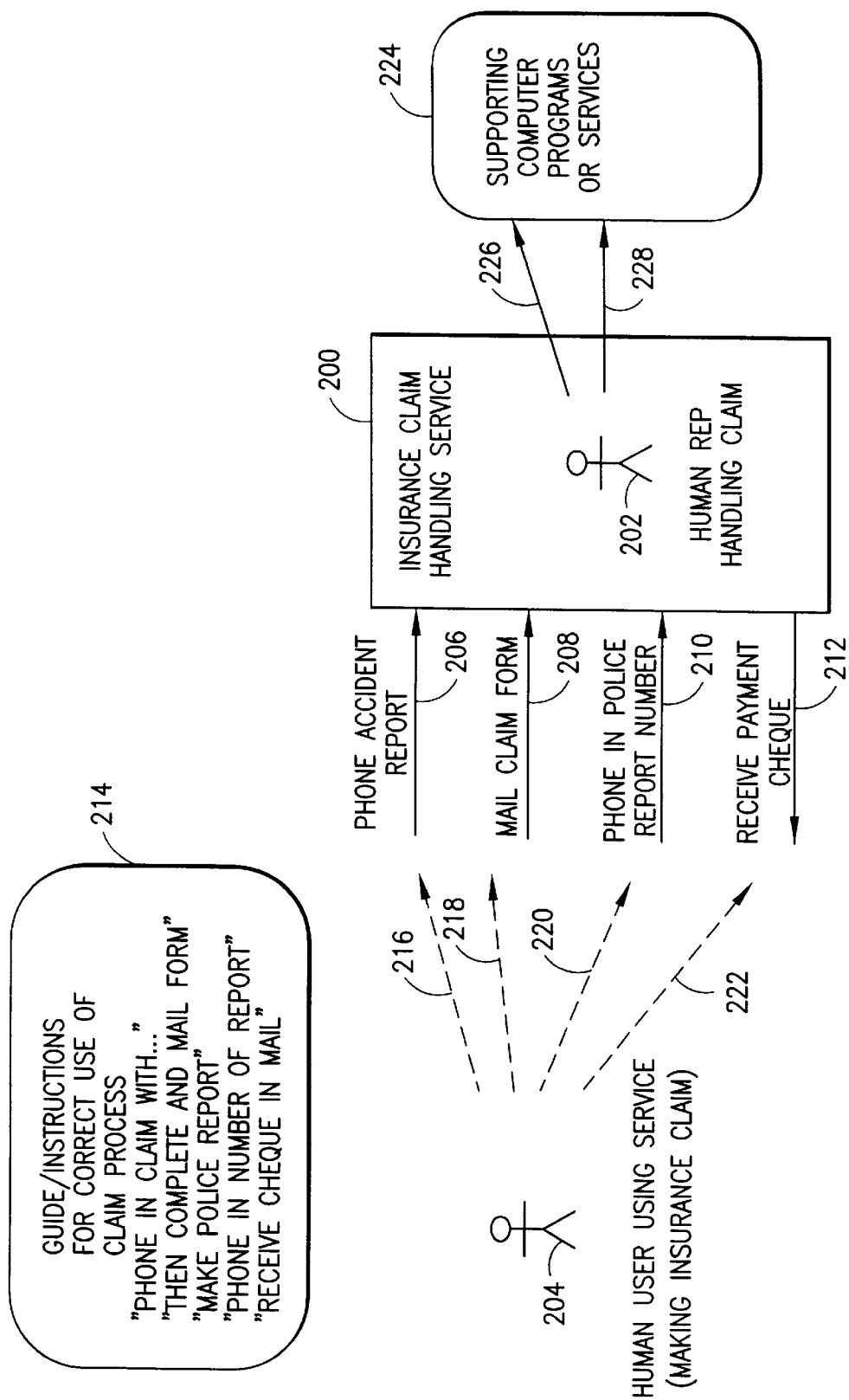
FIG. 2 is a schematic diagram of another conventional system in which informal instructions describing the use of a service are provided by human agents.
Figure 3:
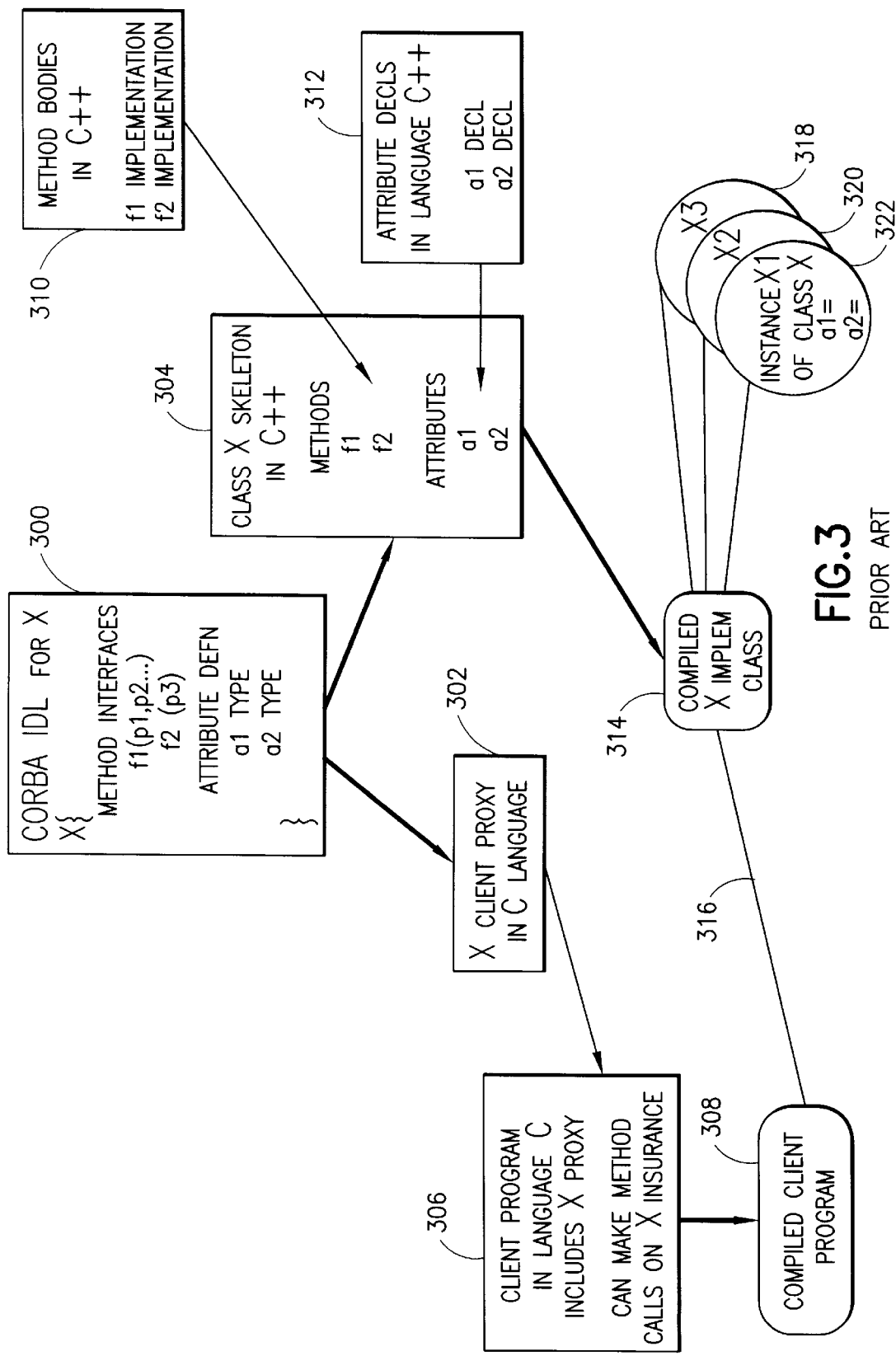
FIG. 3 is a schematic diagram of another conventional system incorporating the object interfaces defined by CORBA.
Figure 4:
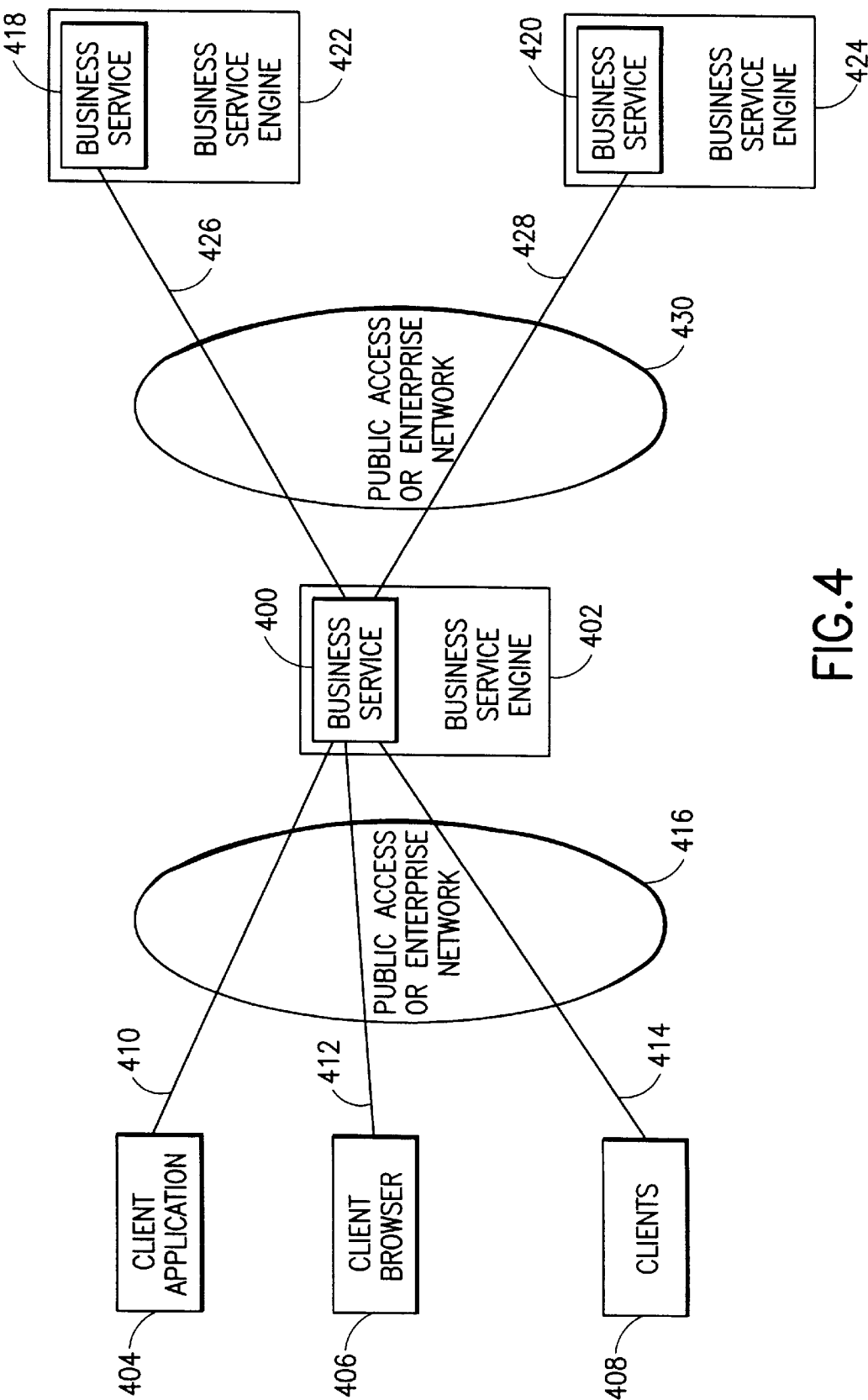
FIG. 4 is a schematic diagram of the components of a business service in a network environment.

Although it can be applied to other environments, the service contract of the present invention has most immediate value in the context of providing a business service on a public network as illustrated in the context of FIG. 4. FIG. 4 is a diagram showing this motivating context by illustrating the concept of an automated business service on a public or widely accessible network. A business service 400 is provided in a networked environment and is implemented as a computer program. This business service program 400 is executed in a business service engine 402. Clients 404, 406 and 408 make requests to this business service 400. The clients typically execute on workstations and PCs which reach the business service engine 402 (e.g., a server) on which the business service program 400 is provided. Client 404 is an application program. Client 406 is a browser providing an end-user with direct access to the service. Conversational connections 410, 412 and 414 are established by the clients 404, 406 and 408, respectively, across the public access or enterprise communication network 416 to request the business service 400.

The business service 400 also may be provided by transmitting requests from the business service engine to subordinate business service applications 418 and 420 executing on remote business service engines 422 and 424, respectively. The business service 400 reaches these subordinate business services 418 and 420 via conversational connections 426 and 428. These connections may be made through a separate public access or enterprise communication network 430.

An important aspect of this business service environment is that, because the communications networks 416 and 430 are public access or widely accessible enterprise networks, the clients and participating business services may all be owned by different organizations with different degrees of understanding and trust of each other.

Figure 5:
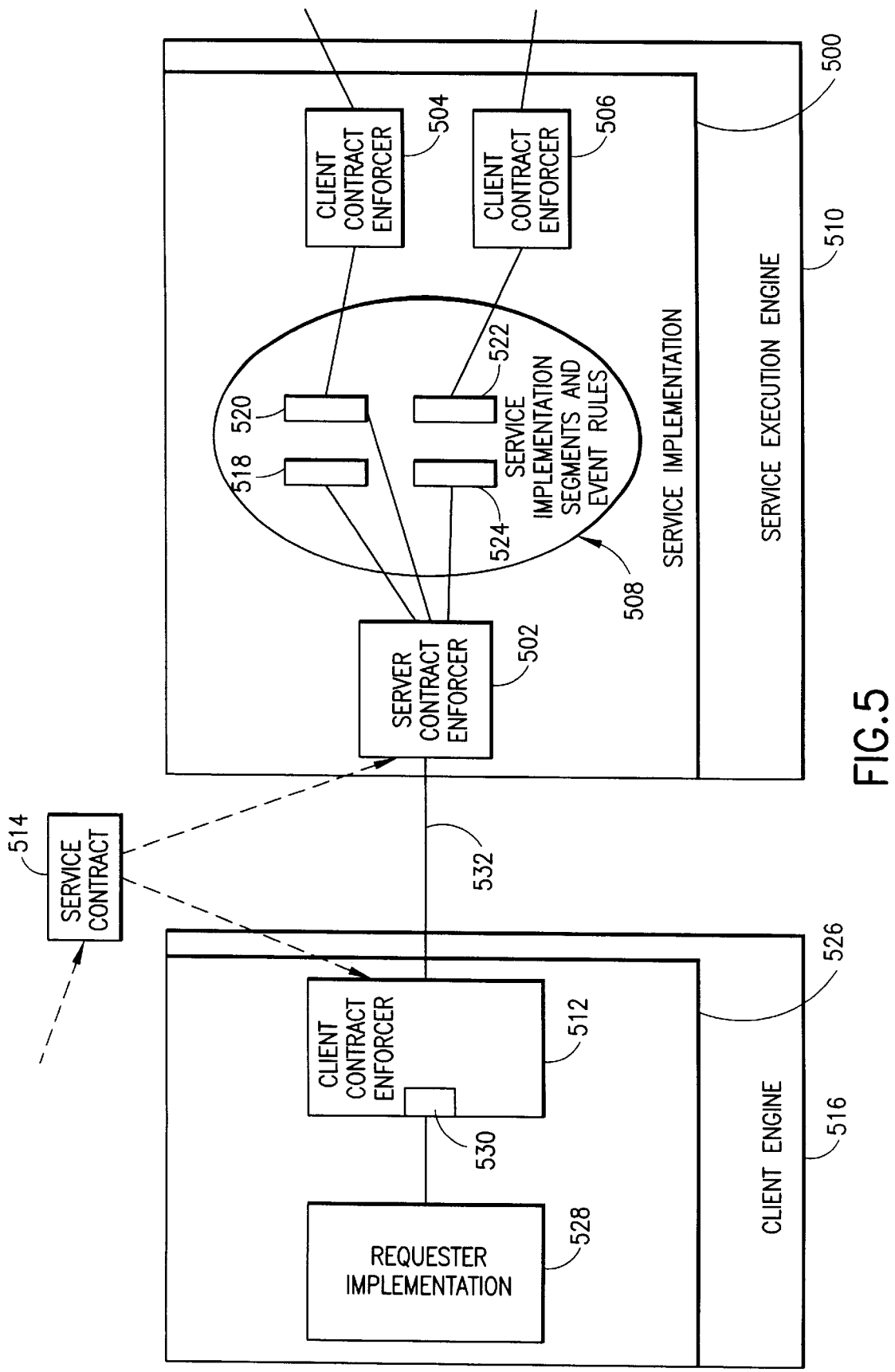
FIG. 5 is a schematic diagram of a system incorporating a business service with a service contract separated from the service implementation, according to an embodiment of the present invention.

FIG. 5 shows a client interacting with a business service provider according to the present invention, where the business service application 500 corresponds to the business service 400 in FIG. 4. However, in FIG. 5, the business service application 500 is expanded to illustrate separate enforcement code components 502, 504 and 506 for enforcing service contract(s) and the service implementation component 508 which contains service implementation logic. The service implementation component 508 executes entirely on the service execution engine 510 of the business service provider. According to an aspect of the present invention, the enforcement code components 502 and 512 are generated from a single service contract 514 and are executed on the service execution engine 510 and the client engine 516, respectively.

The actual service implementation component 508 includes a set of components 518, 520, 522 and 524, each of which may be a program, a procedure, a method call on an object, an event-driven rule for determining which program to execute next, or some other executable logic providing the service. A key aspect of the present invention is that the owner and the provider of the business service 500 controls and has full knowledge of this service implementation component 508. The end user or client application 526, consisting of a requester/client application 528 and an enforcement code component 512, only knows how to interact with the service execution engine 510 via enforcement code component 502 and the contract specification 514 of the corresponding service the engine 510 provides.

The service contract 514, according to the present invention, is a specification of the unambiguous rules of interaction for using the business service which, in contrast to prior art systems, is exclusively created and owned by the provider of the service. It may also be jointly created (e.g., through negotiation) by the provider and the client using the service. In either case, the service contract 514 specifies all the permitted interaction patterns by the client and expresses the required interaction pattern behaviors of the service provider. In other words, the service contract 514 provides for a self-enforcing mechanism for managing the service transactions by providing for enforcement code (or modules) to be written by the respective parties according to the rules of interaction included in the service contract.

An important aspect of the service contract 514 of the present invention is that the enforcement code can be generated automatically therefrom. That is, rather than manually writing code (e.g., for incorporation within an existing application), tools can be provided to automatically generate enforcement code components 512 and 502 which will execute in the client engine as the client contract enforcer component 512 and, in the server engine, as the server contract enforcer component 502. The generated code in these two components executes so that the rules of interaction specified in the service contract 514 are enforced by each of the parties to ensure that the other parties abide by those rules.

The client/requester logic implementation 528 executing in the client engine 516, makes its service requests via an interface 530 which is a standard programming interface identifying the types of requests for service which can be made for the service provided by the application 500. This interface 530 actually passes the requests to the generated client enforcement code component 512. The applications 526 and 500 interact with each other via communication line 532.

According to the present invention, the enforcement code components can serve many purposes in the function of enforcing the specifications of the service contract. For example, enforcement code 512, upon receiving a request to be sent from the application 526, can log the request (noting time and content), number the request for correlation to an anticipated response, provide a signing function, include a timer function and notification in event of timeout and pass the request by a chosen protocol. When receiving a request or response from the service application 500, the enforcement code component can provide some of the functions listed hereinabove and also can determine whether the message is a response or a request, check validity of response and take appropriate action.

Both the client application 526 and service application 500 may have other interactions with other parties governed by different sets of service contracts (not shown). The contract enforcement components 504 and 506 located within the service application 500 are generated from service contracts other than contract 514 and enforce corresponding rules of interactions. Component 524 may play the role of a server or may play the role of a client via different service contracts (not shown). Finally, in the same service contract, each party can play both the role of client and server for different sets of operations.

Figure 6:
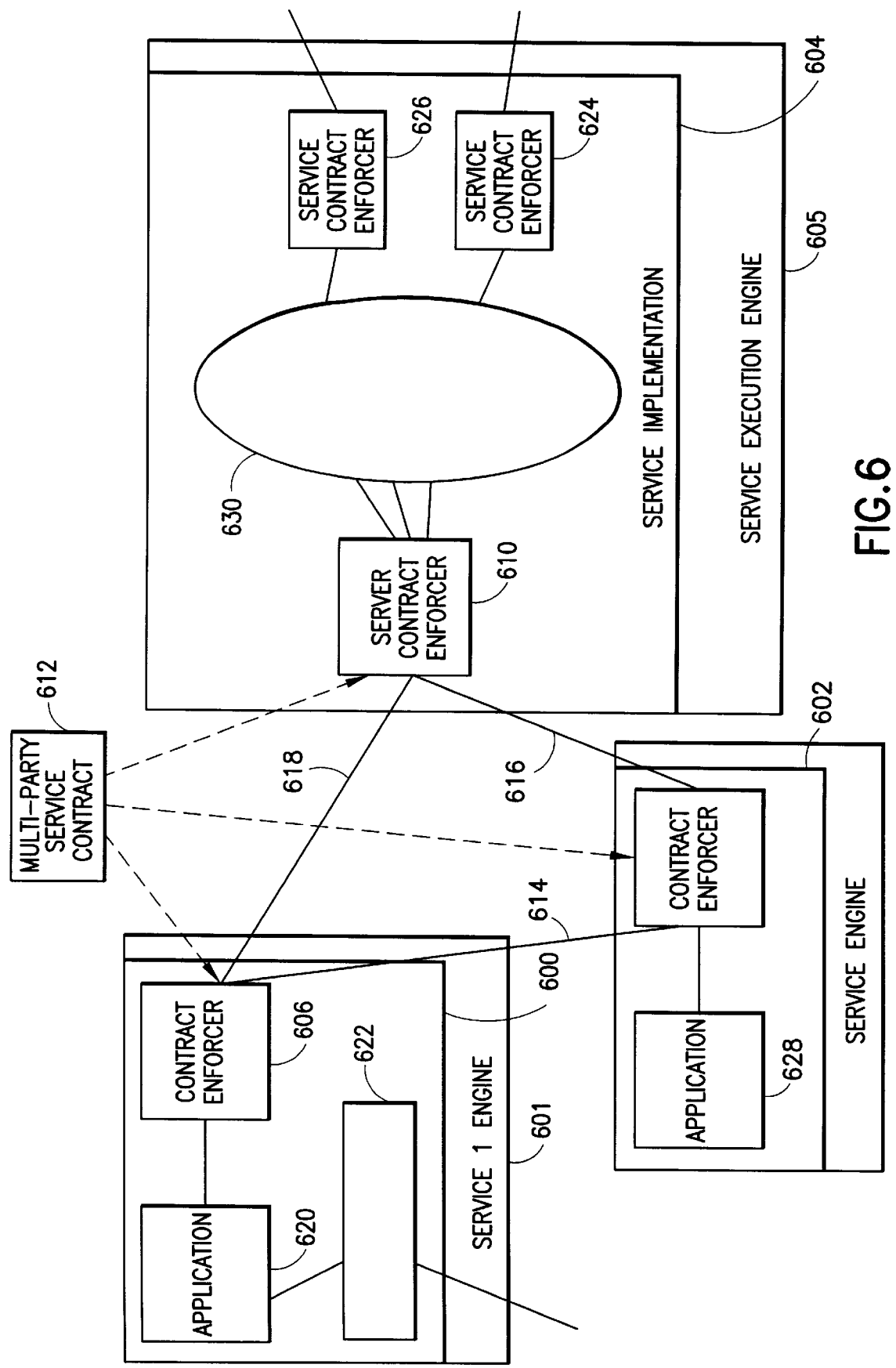
FIG. 6 is a schematic diagram of a system incorporating a multi-party service contract, according to a further embodiment of the present invention.

The service contract of the present invention may also involve multiple parties, where each party plays its role. FIG. 6 illustrates a service contract system among applications 600, 602 and 604 located on service engine 601, service engine 603 and service execution engine 605, respectively. Here, the respective contract enforcement code components 606, 608 and 610 are generated from the service contract 612. The application 620, application 628 and service implementation component 630 interact amongst themselves through the enforcement code components via communication lines 614, 616 and 618.

Each party may play simultaneous roles of a client and a server and also may interact with different set of parties via different set of service contracts. In FIG. 6, application 620 located within application 600 interacts with another partner (not shown) via enforcement code 622, and application 604 interacts with a different set of partners (not shown) via enforcement code components 624 and 626.

Figure 7:
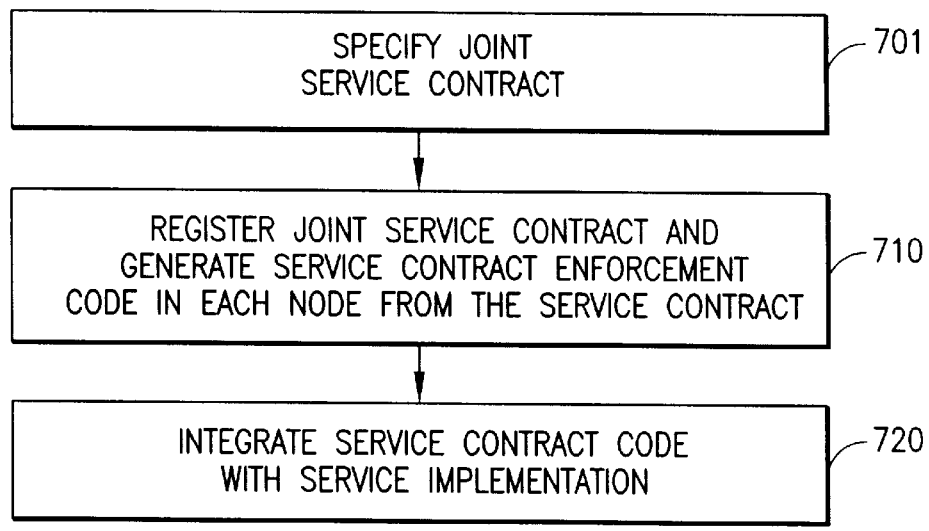
FIG. 7 is a flow diagram of the process of development code enforcing rules of interaction and its integration with the internal service logic, according to an embodiment of the present invention.

FIG. 7 illustrates the development of the contract enforcement code and its integration with a service application, according to an embodiment of the present invention. First, in step 701, the parties create a joint formal document, referred to as the service contract. As indicated hereinabove, the service contract also can be created by a subset of the parties. The elements of one embodiment of the contract are detailed hereinbelow with regard to FIG. 9. The service contract is then registered, in step 710, by all interacting parties in their respective servers. This registration preferably includes storing of a service contract identification number, information regarding the service contract and the service contract itself. In a preferred embodiment, a tool is available for automatically generating enforcement code. The registration aids in this automatic generation of the parties' role-specific contract enforcement code. In the absence of such a tool, however, the code is written by hand, capturing the rules of interaction specified in the contract. The code also contains information on the local application, such as how to invoke the local application, what specific method to call upon receiving a specific message, request or document. Finally, in step 720, the contract enforcement code is generated and integrated with the service implementation code for enabling actual runtime invocation.

Figure 8:
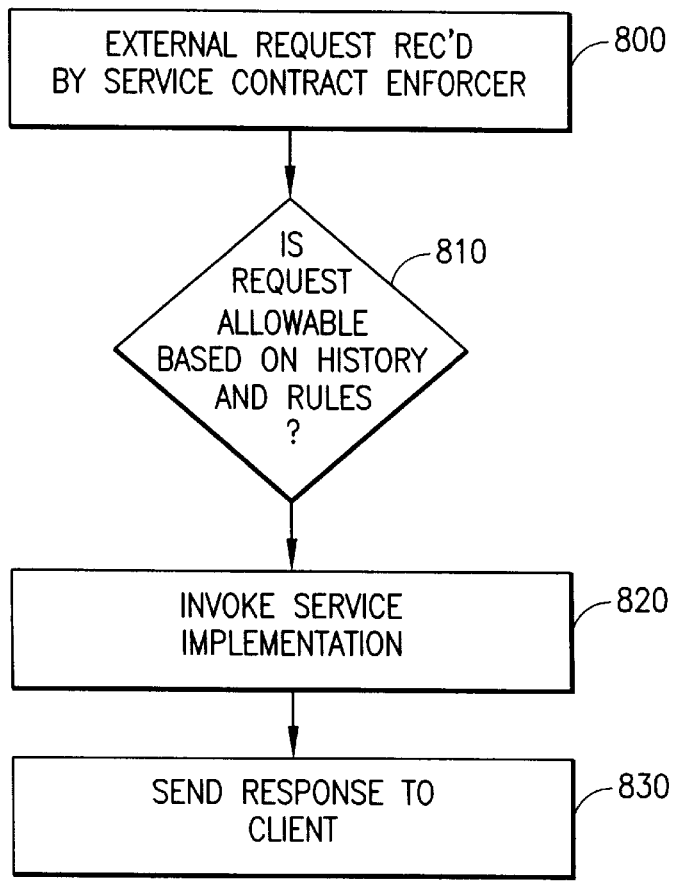
FIG. 8 is a flow diagram of the interactions across business partners via service contract enforcement code, according to an embodiment of the present invention.

FIG. 8 illustrates the use of the contract enforcement code during runtime, according to an embodiment of the present invention. In step 800, an external request (or message, or document) arrives at a particular enforcement code component. The contract enforcement code then determines, based on the incorporated rules of interaction, the current interaction state and the interaction history of the service (e.g., requests and responses received), and whether such a request (or message, or document) is acceptable from the specific requester as per the rules of interaction, in step 810. If the request is determined to be acceptable, the contract enforcement code invokes, in step 820, an appropriate application method (or program). After the appropriate service implementation logic is executed to provide this service, a response may be generated. Note that the execution may be synchronous or asynchronous with the client request. The service logic may be a simple program or a multi-step execution synchronously or asynchronously involving business rules and internal methods where the business rules specify how the next method or execution step is to be selected. That is, the service logic may be adapted to support long-running interactions or sequences of interactions which are timed apart. For example, the logic can support a situation in which a customer requests a reservation with a hotel service provider and requests a cancellation days later. In this example, the service contract of the present invention will capture the rules of interaction for such timed-apart interactions. The service logic may also make requests on other partners via other service contract enforcement code or via the same contract enforcement code. Hence, if there is a response to the original request, the service implementation logic sends the response to the particular contract enforcement code, in step 830. The contract enforcement code may add this response to the history of interactions, before sending it back to the original requester. Finally, if the original request is determined to be unacceptable, in step 810, the requester may be notified of this rejection in step 840. The contract enforcement code may also specify independent action to be taken by a partner in the absence of a response from another partner within a pre-specified time.

Figure 9:
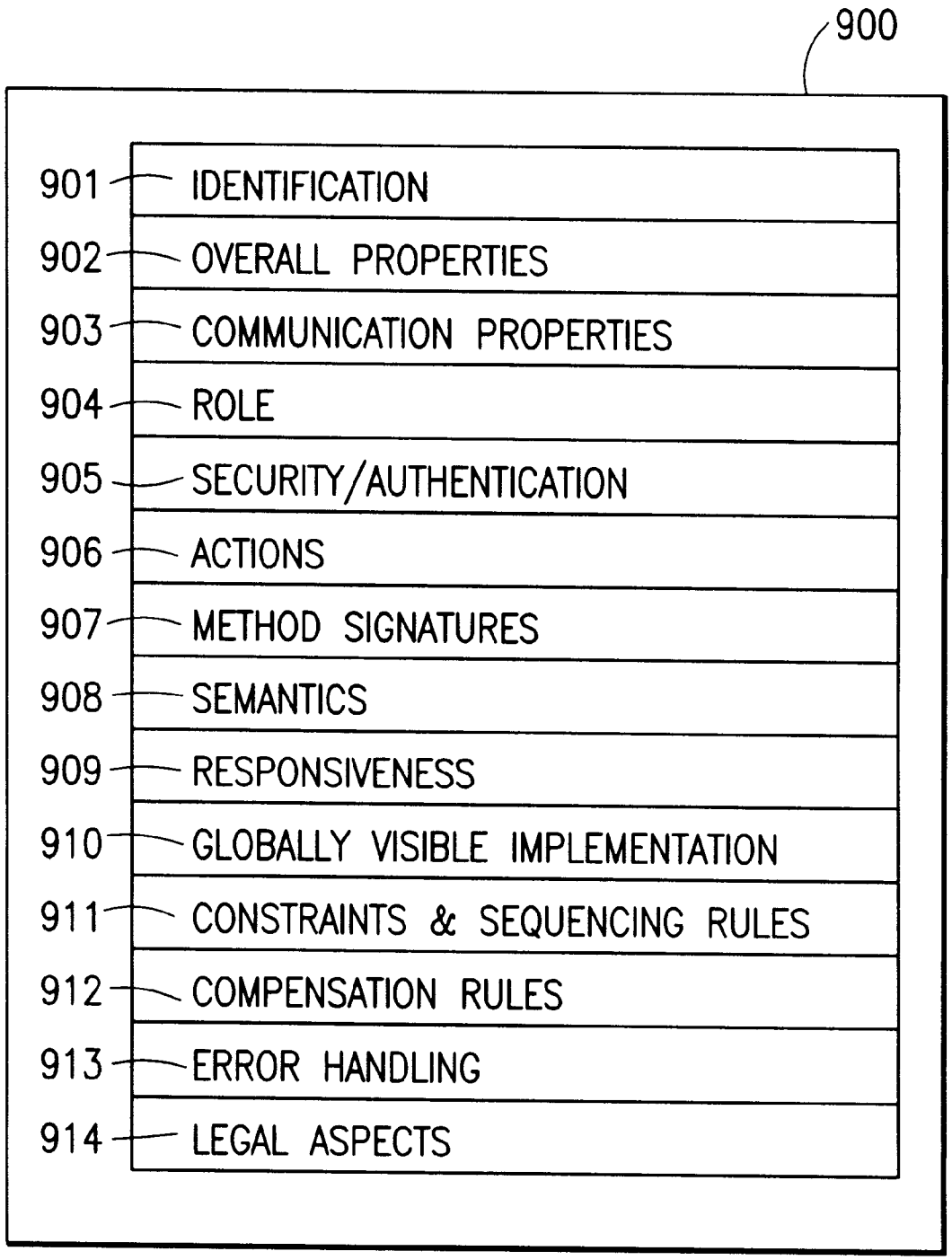
FIG. 9 illustrates the components of a service contract, according to an embodiment of the present invention.

FIG. 9 illustrates possible elements of a service contract 900 according to an embodiment of the present invention. Clearly, there are many variations of what types of information and which rules are to be included and, hence, enforced in a specific contract. In a preferred embodiment, the fields 901 through 914 are likely to be specified in a service contract. The identification field 901 identifies all the contractual parties. Not all parties may be pre-specified and additional partners may be identified during invocation of such a contract. The overall properties field 902 specifies the information and rules regarding the contract document, rather than those applicable to a specific operation. These properties may include the valid duration of the contract, the number of times a specific contract can be used, how often the contract can be invoked, etc. The communication properties field 903 specifies how the parties can communicate with each other, i.e., transport protocol to be used, electronic address to used, etc. The role field 904 specifies the various roles and the associated operations which can be performed by the partners. A single partner can play multiple roles, and multiple partners can play a single role not only in different invocations, but also in the same instantiation of the contract.

The security and administration field 905 specifies the security requirements, e.g., signatures on specific requests and responses, non-repudiation, etc. It may also specify the public key of the communicating partners or how to obtain such information. The actions field 906 specifies the actions performed by each role. For example, the role of a hotel service provider may accept requests for reservation, cancellation and modification, while multiple partners may play the role of a hotel service provider. The method signatures field 907 details the documents or messages exchanged per action. A method signature specifies the name of the request or response or message. The semantics field 908 specifies the semantic relationships across multiple messages or requests or responses. The semantics may include whether or not an operation can be undone or permanently committed. The responsiveness field 909 specifies the time a requester has to wait before taking independent actions. The globally visible implementation field 910 specifies changes in the state of interaction, e.g., value of an attribute, specification of an rule, performing a dependent action, etc. The constraint and sequencing rules field 911 specifies what requests are acceptable at what point based on interaction state and requester identity. The compensation rules field 912 specifies what past requests can be canceled and under what constraints. The error handling field 913 specifies what actions to take in the presence of an exception. This includes how many times to resend a message or request or response, before taking an independent action, what independent action to take in the presence of an exception, how to resolve disputes across applications of the partners, etc. Finally, the service contract 900 includes a legal aspects field 914 that specifies what terms and conditions are legally binding.

It is important to note that a service contract according to the present invention specifies the actions to be taken strictly on the basis of the interaction state and not based on the implementation state of any of the partners.

Now that the invention has been described by way of a preferred embodiment, various modifications and improvements will occur to those of skill in the art. Thus, it should be understood that the preferred embodiment is provided as an example and not as a limitation. The scope of the invention is defined by the appended claims.

We claim:

1. A service contract for managing service transactions between a plurality of parties each having a computer system coupled to a communication network and one or more applications running thereon, the service contract comprising:

a specification of unambiguous rules of interaction for the parties during one or more of the transactions, the specification adapted to facilitate the generation of enforcer code associated with the one or more applications of each of the plurality of parties, the enforcer code capable of enabling interaction and enforcing the rules of interaction.

2. The service contract of claim 1 wherein, for any of the transactions, one of the parties is a client having a client application running on a client computer system and one of the parties is a service provider having a service application running on a server computer system and wherein the service contract specification is adapted to generate a client contract enforcer module to interface with the client application implementation logic and a server contract enforcer module to interface with the service application implementation logic.

3. The service contract of claim 2 wherein each of the enforcer modules is separate from the respective implementation logic.

4. The service contract of claim 2 wherein the specification is adapted to automatically generate the client contract enforcer module and the server contract enforcer module or configure preexisting contract enforcer modules.

5. The service contract of claim 2 wherein the client contract enforcer module is generated within the client application and/or the server contract enforcer module is generated within the service application.

6. The service contract of claim 2 wherein the client contract enforcer module and the server contract enforcer module are generated at one or more third parties.

7. The service contract of claim 2 wherein the enforcer modules are computer programs.

8. The service contract of claim 7 wherein the enforcer modules are independently developed by the respective parties.

9. The service contract of claim 1 wherein the enforcer code is generated to be separate from implementation logic of the applications so that the implementation logic of one party is not exposed to the application of the other party.

10. The service contract of claim 1 wherein the specification is adapted to automatically generate the enforcer code or configure preexisting enforcer code.

11. The service contract of claim 1 wherein the specification includes all the permitted interaction operations of the parties.

12. The service contract of claim 1 wherein the enforcer code associated with each of the plurality of parties is different from the other enforcer code.

13. The service contract of claim 1 wherein the rules of interaction include one or more of: allowable sequences of interactions, valid and invalid timings of interactions, state diagrams specifying interactions and conditions under which the service will be terminated, canceled or compensated.

14. The service contract of claim 1 wherein the specification supports long-running interactions or sequences of interactions.

15. The service contract of claim 1 wherein the specification is formally expressed in a computer-readable language that can be compiled or otherwise processed to generate the enforcer code.

16. The service contract of claim 1 wherein. for each transaction. each of the plurality of parties can act as a client and as a service provider.

17. The service contract of claim 1 wherein the communication network is a public access network or an enterprise network.

18. The service contract of claim 17 wherein the communication network is the Internet or the Web.

19. The service contract of claim 1 wherein the specification comprises one or more of: an identification field including all contractual parties, an overall properties field including information and rules regarding the service contract, a communication properties field including methods of communication between the parties, a role field including permissible roles and operations of the parties, a security field including security requirements, an actions field including actions performed by each permissible role, a method signatures field including documents or messages exchanged per action, a semantics field including semantic relationships across multiple messages, requests or responses, a responsiveness field including a time a requester must wait before taking independent action, a globally visible implementation field including changes in a state of interaction, a constraints and sequencing field including acceptability of requests at certain points based on interaction state and requester identity, a compensation rules field including circumstances under which certain past requests can be canceled, an error handling field including actions to take in the presence of an exception, and/or a legal aspects field including legally binding terms and conditions.

20. A service contract for managing service transactions between a plurality of parties, each having a computer system coupled to a communication network, at least one of the computer systems having one or more applications running thereon, the service contract comprising:

a specification of unambiguous rules of interaction for the parties during one or more of the transactions, the specification adapted to facilitate the generation of enforcer code associated with operating environments of each of the plurality of parties, the enforcer code capable of enabling interaction and enforcing the rules of interaction.

21. A method for managing service transactions between a plurality of parties, each having at least one computing svstem coupled to a communication network and one or more applications running thereon, the method comprising the steps of providing at least one service contract having unambiguous rules of interaction between the plurality of parties during, one or more of the transactions;

registering the service contract in a computing system of each of the plurality of parses; and generating, from the service contract, enforcer modules consistent with the rules of interaction for managing transactions of the service, the enforcer modules being associated with the one or more applications.

22. The method of claim 21 wherein the parties comprise a client having client implementation logic and a service provider having service implementation logic.

23. The method of claim 22 further comprising the step of interfacing the enforcer modules with the implementation logic.

24. The method of claim 21 wherein the generating step comprises the step of automatically generating, from the service contract, the enforcer modules.

25. The method of claim 22 wherein the generating step comprises the step of generating a client enforcer module at the client and a service provider enforcer module at the service provider. the enforcer modules being separate from the implementation logic.

26. The method of claim 25 further comprising the steps of:

receiving, at the service provider, a request for a service transaction;

determining, by the service provider enforcer module, the acceptability of the request; and invoking, responsive to the determining step, the service implementation logic.

27. The method of claim 26 wherein the determining step comprises the step of analyzing an interaction history and the rules of interaction.

28. The method of claim 26 wherein the invoking step comprises the step of invoking, upon the request being determined to be acceptable, the service implementation logic.

29. The method of claim 26 further comprising the step of sending a response from the service implementation logic through the service provider enforcer module, to the client.

30. The method of claim 21 wherein the generating step comprises the step of generating the enforcer modules at a third party enforcer.

31. The method of claim 21 wherein the providing step comprises the step of developing the at least one service contract.

32. The method of claim 31 wherein the developing step comprises the step of jointly developing, by the parties, the at least one contract.

33. The method of claim 21 wherein the registering step includes the step of collecting information on the local application.

34. The method of claim 33 wherein the registering step includes the step of collecting invocation and/or method call information.

35. A method for managing service transactions between a plurality of parties coupled to a communication network, the method comprising the steps of:

providing at least one service contract having unambiguous rules of interaction between the plurality of parties regarding a service;

registering the service contract in each of the plurality of parties; and automatically configuring, from the service contract, pre-existing party applications consistent with the rules of interaction for managing transactions of the service.

* * * * *